Dec. 8, 1953
O. W. GRAHAM
2,661,550
METHOD AND APPARATUS FOR CONTROLLING
A DREDGING OPERATION
Filed May 2, 1951
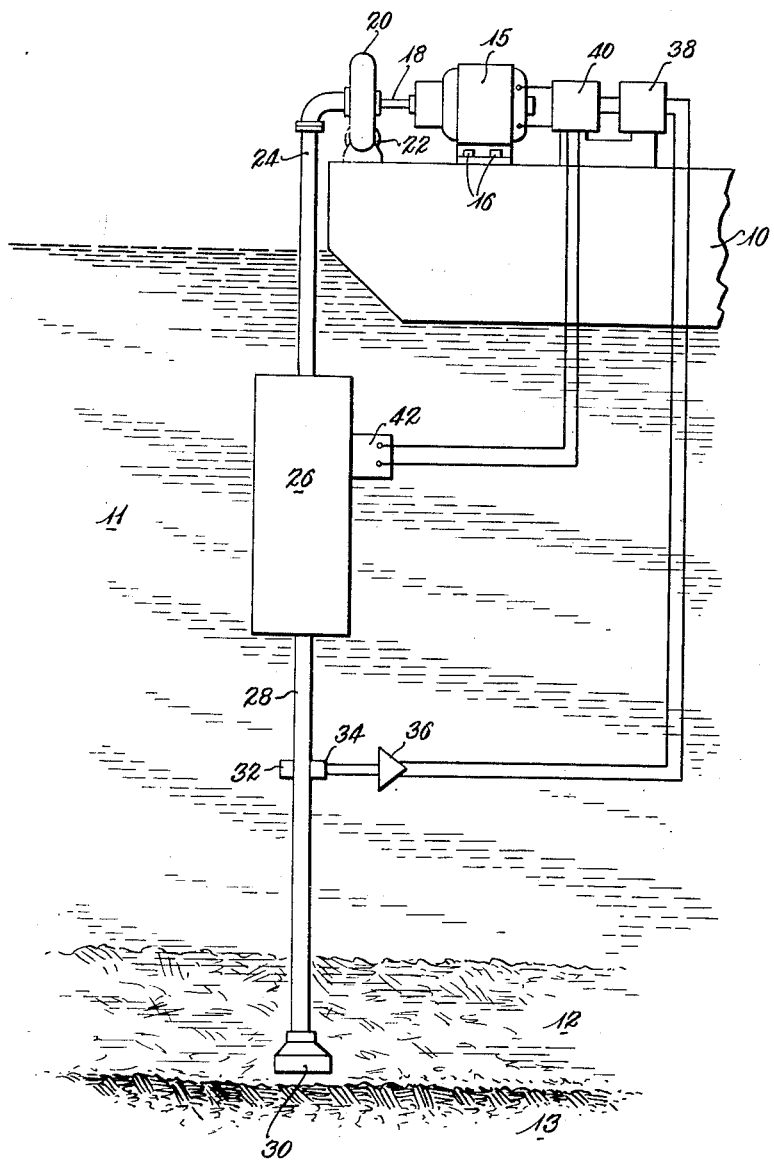
INVENTOR
*Ollie W. Graham*
BY *Stevens, Davis, Miller and Mosher*
ATTORNEYS Patented Dec. 8, 1953

2,661,550

UNITED STATES PATENT OFFICE 2,661,550

METHOD AND APPARATUS FOR CONTROLLING A DREDGING OPERATION

Ollie W. Graham, Tulsa, Okla., assignor to Instruments, Inc., Tulsa, Okla., a corporation of Oklahoma Application May 2, 1951, Serial No. 224,190

6 Claims. (Cl. 37—58)

1

This invention relates to a method and apparatus for detecting the presence of suspended particles in a liquid flowing through a pipe. More particularly this invention relates to a method and apparatus which will aid the operator of a dredge in determining instantaneously the presence of suspended particles in the standpipe of the dredge as the dredging operation is being carried out. Additionally, the method and apparatus of this invention can be arranged to automatically control the dredging process.

It is important during the dredging operation for the operator to know whether or not there are any suspended particles in the liquid being pumped through the standpipe of the dredge. This indication which the operator gains with respect to the suspended particles in the liquid enables the operator to estimate the distance the standpipe is from the bed underlying the body of water in which the dredging operation is being carried out. If the distance between the end of the standpipe and the bed underlying the body of water becomes too small the standpipe will begin to draw a heavier load due to the increase of suspended particles in the liquid. If the load becomes too heavy, it will have a harmful effect upon the motor driving the pump. If the load becomes too great, there is the danger that the motor will be unable to carry the load and hence burn out. Additionally, the standpipe may become clogged.

Accordingly, this invention provides a method and apparatus to enable the operator of the dredging operation to be apprised of the condition of the standpipe in regard to suspended particles in the liquid passing therethrough. Further, this detection of the particles suspended in the liquid passing through the standpipe also provides a means to automatically control the dredging operation. This is accomplished with the present invention by taking advantage of the fact that suspended particles in the liquid possess a recordable and indicatable degree of transparency to radioactive radiation, particularly gamma radiation. It also takes advantage of the fact that some radioactive radiation, particularly gamma radiation will pass through a steel tube and can be detected and measured electrically.

Thus, by placing a source of radiation and a detector of that radiation in such a position relative to the standpipe, that the suspended particles in the liquid flowing through the standpipe will pass between the source of radiation and the detector, it is possible by the method and means of this invention, to detect instantaneously the condition of the standpipe with regard to suspended particles therein. This detection or determination can be used to automatically control

2 the motor which is driving the pump in the dredging operation and further to control the position of the standpipe relative to the bed underlying the body of water.

It is accordingly, an object of this invention to provide an efficient method and apparatus for determining and detecting suspended particles in a body of liquid passing through a standpipe of a dredge.

It is a further object of this invention to provide a method and apparatus for detecting suspended particles in a liquid passing through a standpipe of a dredge and in utilizing this information to control the motor driving the pump of the dredging operation and to control the standpipe relative to the bed underlying the body of water in which the dredging operation is being carried out.

Further objects and advantages of this invention will become apparent from the following detailed description of this invention when considered in conjunction with the appended drawing.

The drawing is a diagrammatic view of apparatus utilized with a dredging operation. The drawing shows a dredge located on a body of water and a standpipe projecting from the dredge toward the bed underlying the body of water. The detecting means of the present invention is shown cooperating with the standpipe to control its relative position and the condition of the motor driving the pump of the dredging operation.

As illustrated in the drawing, a dredge 10 is floating on a body of water indicated as 11. The bed underlying the body of water 11 consists of a semi-fluid mud zone 12, in which there is a relatively high ratio of water with respect to mud particles. Beneath the layer 12 is a further layer 13 which consists of a more compact layer of mud particles.

The dredge 10 has mounted thereon a motor 15 by means of bolts 16. The motor 15 can be any suitable type, however, as shown it is an electric motor. The motor is supplied with electric current from suitable source not shown. The output shaft 18 of the motor 15 is connected to drive a pump 20. The pump 20 is of the centrifugal type and is arranged with a discharge outlet 22 to conduct dredged material to a suitable place of deposit. Connected to the intake side of the pump 20 is a pipe 24 which communicates into a member 26. At the bottom of the member 26 is arranged a standpipe 28 having at the end thereof a head 30. The member 26 is arranged to adjust the vertical position of the standpipe 28 with respect to the beds 12 and 13 underlying the body of water 11.

Mounted in conjunction with the standpipe 28 on one side thereof is a source of radioactivity 32. This source of radioactive radiation is generally radium or some other source of gamma radiation. However, it can be a source of neutrons or other penetrating radioactive radiation. On the opposite side of the standpipe 28 is placed a detector 34 of the type that detects the radioactive radiation given off by the source 32. It is preferred that a Geiger-Müller counter be employed as the detector 34. However, the detector 34 can be an ionization chamber or it can be specially arranged to detect neutrons or some other special kind of radiation as distinguished from the more usual gamma radiation. The detector 34 is electrically connected to an amplifier 36, which is usually of the pre-amplifier type and which is either powered by batteries contained in it or powered by some external source of power not shown. In a similar way, electrical power is supplied for the operation of the detector or Geiger-Müller counter 34 which generally takes a direct current voltage of the order of approximately 200 volts.

The output from the preamplifier 36 is connected to an amplifying unit 38 mounted on the dredge 10. The output from amplifying unit 38 is led into a controlling unit 40. The electric power supplied to motor 15 is also led through this control unit 40. The control unit 40 is so arranged that it will shut off the power to motor 15 if the head 30 of the standpipe 28 approaches too closely to the compact mud layer 13 as the motor 15 would be unable to carry a load of the mud of such a magnitude through the standpipe 28. Further the control unit 40 is connected to a unit 42 which is mounted in conjunction with member 26. Electrical energy is supplied to unit 42 and by means of member 26, the relative position of the standpipe 28 and head 30 is controlled with respect to the beds 12 and 13 underlying the body of water 11. The signals received by the control unit 40 which are indicative of the particles suspended in the liquid flowing through the standpipe 28 are used to control both the motor 15 and the member 26 which in turn determines the relative position of the standpipe 28.

While this invention has been described in a specific embodiment, nevertheless, various changes and modifications obvious to one skilled in the art, are within the spirit, scope and contemplation of the present invention.

I claim:

1. The method for controlling a dredging operation that comprises pumping a liquid containing suspended particles through a standpipe of the dredge, passing penetrating radioactive radiation through said standpipe at one point, detecting said radiation after it is passed through said standpipe, converting said radiation into electrical signals indicative of the suspended particles in said liquid and utilizing said electrical signals to control the dredging operation.

2. The method for controlling a dredging operation that comprises pumping a liquid containing suspended particles through a standpipe of the dredge, passing penetrating radioactive radiation through said standpipe at one point, detecting said radiation after it is passed through said standpipe, converting said radiation into electrical signals indicative of the suspended particles in said liquid, electrically conveying said electrical signals to a remote point, amplifying said electrical signals, and causing said electrical signals to control the pumping of said liquid.

3. The method for controlling a dredging operation that comprises locating a standpipe adjacent the bed underlying a body of water, pumping a liquid containing suspended particles through said standpipe, passing penetrating radioactive radiation through said standpipe at one point, detecting said radiation after it is passed through said standpipe, converting said radiation into electrical signals indicative of the suspended particles in said liquid, electrically conveying said electrical signals to a remote point, amplifying said electrical signals, and causing said electrical signals to control the pumping of said liquid and the relative position of said standpipe.

4. Apparatus for controlling a dredging operation that comprises a motor, a pump having its shaft connected to the output shaft of said motor, a standpipe connected to the intake of said pump, said standpipe being adapted to transport therethrough a liquid carrying suspended particles, a source of penetrating radioactive radiation and a detector of said radiation fixedly located at one point on said standpipe in such spaced relation to each other that said liquid containing suspended particles will pass therebetween, said detector acting to convert the detected radiation into electrical signals, and means responsive to said electrical signals to control the dredging operation.

5. Apparatus for controlling a dredging operation that comprises a motor, a pump having its shaft connected to the output shaft of said motor, a standpipe connected to the intake of said pump, said standpipe being adapted to transport therethrough a liquid carrying suspended particles, a source of penetrating radioactive radiation and a detector of said radiation fixedly located at one point on said standpipe in such spaced relation to each other that said liquid containing suspended particles will pass therebetween, said detector acting to convert the detected radiation into electrical signals, means to amplify said electrical signals, and means responsive to said amplified electrical signals to control the operation of said motor.

6. Apparatus for controlling a dredging operation that comprises a motor, a centrifugal pump having its shaft connected to the output shaft of said motor, a standpipe connected to the intake of said pump, said standpipe being located adjacent a bed underlying the body of liquid in which the dredging operation is being carried out, said standpipe being adapted to transport therethrough a liquid carrying suspended particles, a source of penetrating radioactive radiation and a detector of said radiation fixedly located at one point on said standpipe in such spaced relation to each other that said liquid containing suspended particles will pass therebetween, said detector acting to convert the detected radiation into electrical signals, means to amplify said electrical signals, and means responsive to said amplified electrical signals to control the operation of said motor and the position of said standpipe relative to said bed.

OLLIE W. GRAHAM.

References Cited in the file of this patent

UNITED STATES PATENTS

| Number | Name | Date |
| --- | --- | --- |
| 1,619,850 | Casey | Mar. 8, 1927 |
| 1,668,671 | Dailey | May 8, 1928 |
| 2,456,233 | Wolf | Dec. 14, 1948 |
| 2,501,174 | Herzog | Mar. 21, 1950 |